C. H. KAYSER & W. H. HAMPTON.
FIRE DETECTOR APPARATUS.
APPLICATION FILED SEPT. 25, 1912.

1,176,460.

Patented Mar. 21, 1916.

WITNESSES:
Fredk W. Frantzel
Russell T. Abel

INVENTORS
Charles H. Kayser & William H. Hampton,
BY Frantzel and Richards,
ATTORNEYS

UNITED STATES PATENT OFFICE.

CHARLES H. KAYSER, OF WEST ORANGE, NEW JERSEY, AND WILLIAM H. HAMPTON, OF NEW YORK, N. Y., ASSIGNORS TO IDEAL FIRE DETECTOR COMPANY, A CORPORATION OF NEW JERSEY.

FIRE-DETECTOR APPARATUS.

1,176,460. Specification of Letters Patent. Patented Mar. 21, 1916.

Application filed September 25, 1912. Serial No. 722,213.

*To all whom it may concern:*

Be it known that we, CHARLES H. KAYSER, a citizen of the United States, residing at West Orange, in the county of Essex and State of New Jersey, and WILLIAM H. HAMPTON, a citizen of the United States, residing at New York, in the county of New York and State of New York, have invented certain new and useful Improvements in Fire-Detector Apparatus; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in fire-detector apparatus; and, the invention has reference, more particularly, to further improvements in the construction of electric fire-alarms and heat-indicating devices, such as are described in former Letters-Patent No. 1,016,268, dated February 6th, 1912.

The present invention has for its general purpose to provide a novel construction of device or apparatus which automatically closes an electric circuit to sound an alarm, or to operate other types of annunciators, when the device or apparatus is subjected to abnormal heat, but which maintains the said electrical circuit interrupted or broken under a wide variation or fluctuation of normal temperature-conditions.

The present invention has for its principal object to provide a novel and simply constructed device or apparatus for the purposes above indicated, and means for detachably supporting the same in operative electrical connection with an electric alarm-circuit.

Other objects of the present invention not at this time more particularly enumerated will be clearly understood from the following detailed description of the present invention.

The invention is clearly illustrated in the accompanying drawings, in which:—

Figure 1:
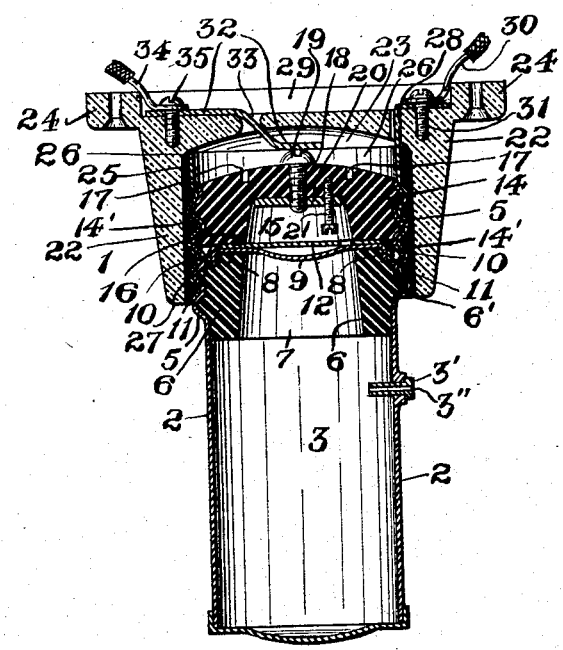
Figure 2:
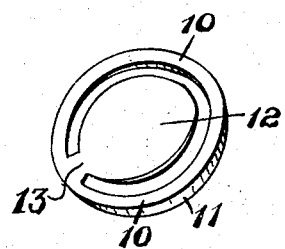

Figure 1 is a longitudinal vertical section of the novel fire-detector device and its novel supporting means, whereby the same is connected in an electric alarm-circuit; and Fig. 2 is a detail perspective view of a movable contact-element employed in the circuit make and break device of the said apparatus.

Similar characters of reference are employed in all of the said above described views, to indicate corresponding parts.

Referring now to the said drawings, the reference-character 1 indicates one embodiment of a complete device or apparatus made according to the principles of the present invention, the same comprising a hollow metallic body-portion 2, adapted to provide an air-chamber 3, said body-portion being closed at its lower end with an end-wall 4. The upper end of said metallic body-portion 2 is provided with a screw-thread 5 formed in its walls, which being of thin metallic structure provides externally and internally disposed screw-threads, as will be evident. Secured in the walls of said body-portion 2 is a compensating air-vent means, the same comprising a suitable block 3′ provided with a perforation or vent 3″ of very minute diameter, which communicates with said interior air-chamber 3. Secured in the upper end of said body-portion 2 is a supporting block 6 having external screw-threads 6′ engaging the internal side of said screw-thread 5 formed in said body-portion 2, said supporting-block 6 is constructed of some insulating material, or of a suitable material which is a non-conductor of electricity, such as hard-rubber, fiber, or similar substance. Said supporting-block 6 is provided with a centrally disposed hole or opening 7 which communicates with the interior air-chamber 3 of said body-portion 2, said supporting block 6 being further provided, at its upper peripheral edge, with an annular groove or receiving channel 8. Stretched across the upper end of said supporting block 6 is a flexible diaphragm 9, which extends over said hole or opening 7. Said diaphragm 9 is made of some resilient or flexible air-proof material, such as gold-beater's skin, parchment, rubber, oil-silk, or other suitable fabric or material, and the peripheral or circumferential edges of said diaphragm 9 extend over and into said groove or receiving channel 8 of said supporting-block 6. Extending over said diaphragm 9 is a contact-element, the same comprising a ring-like member 10 having a downwardly extending peripheral flange 11 which extends into said groove or receiving channel 8 of the supporting-block 6, thereby tending to clamp said diaphragm in its operative connection with said supporting-block. Connected with said ring-like member 10, and preferably forming an integral part thereof, is a contact-disk 12 which is centrally disposed within said ring-like member, so as to extend above the diaphragm 9, and which is connected with the inner periphery of said ring-like member 10 by means of a connecting tongue-piece 13. Secured to said body-portion 2, by means of its external screw-threads 14' which engage the internal side of said screw-thread 5 of said body-portion 2, is a second supporting block 14 also constructed of some insulating material, or material which is a non-conductor of electricity such as hard-rubber, fiber, or similar substance. Said second supporting block 14 is provided with a centrally disposed chambered portion or cavity 15, at its under side, which registers above said contact-disk 12 and said diaphragm 9. The lower peripheral edges 16 of said second supporting block 14 engage said ring-like member 10 and clamp the same and the diaphragm engaged by said ring-like member between said first-mentioned supporting block and said second-mentioned supporting-block. Said second supporting block 14 may be provided with spanner-wrench receiving holes 17, by means of which a tool may be applied, so as to receive the same to permit the removal of said contact-element or said diaphragm should it be desired to replace either of said parts. Centrally mounted in the top of said second supporting-block 14 is a primary contact-screw 18, the head 19 of which is exposed above the top of said second supporting-block 14. The shank of said primary contact-screw 18 extends downwardly through said supporting block 14 and into said cavity 15 where it engages a bridge-piece 20, and connected with said bridge-piece 20 is a secondary contact-screw 21 which is adjustable, and which extends downwardly into said cavity 15, so as to register above said contact-disk 12, but not in electrical contact therewith.

The reference-character 22 indicates a socket-body preferably made of porcelain, or any other suitable material which is a non-conductor of electricity. Said socket-body provides a receiving recess or socket 23, and said socket-body is further provided with outwardly extending perforated ears or lugs 24, whereby the same may be fastened to a wall, ceiling, or other place by means of screws or the like. Secured within said receiving recess or socket 23 of the socket-body 22, by means of cement 25, or any other suitable fastening means, is a metallic shell 26, the walls of which are formed to provide receiving screw-threads 27 which receive the external side of the screw-thread 5 of said body-portion 2, and whereby the latter is both suspended or supported in its operative position, and is also electrically connected in an electric alarm-circuit, as will be presently described. Said metallic shell 26 is provided with an upwardly extending lug or terminal plate 28, which is bent over into the wiring-trough 29 at the top of said socket-body, and a wire conductor 30, forming a part of the electric alarm-circuit, is secured to said lug or terminal plate by means of a screw 31, or other suitable fastening device.

The reference-character 32 indicates a spring-like terminal brush which lies in said wiring trough 29, and the free end of which extends downwardly through a suitable opening or passage 33 in the upper wall of said socket-body, so as to project within the recess or socket 23, where it may receive the contact or electrical engagement of the head 19 of said primary contact-screw 18. A wire conductor 34, also forming a part of the electric alarm-circuit, is secured to said terminal brush 32 by means of a screw 35, or any other suitable fastening means.

The electric alarm-circuit is established as follows:—The current passing through the wire conductor 30 passes through said lug or terminal-plate 28 into said metallic shell 26, and thence into said metallic body-portion 2. The said ring-like member 10 contacts with said body-portion 2 and thus receives the current and passes the same into the contact-disk 12. When under abnormal temperature-conditions, such as a sudden influx of heat about the body-portion 2, the air contained in the air-chamber 3 thereof is expanded, the expanded air presses upwardly upon the diaphragm 9 which in turn carries upwardly the contact-disk 12 into contact with the secondary contact-screw 21, from which said contact-disk 12 is normally separated, thus bridging the gap and permitting the current to pass into said secondary contact-screw 21, through said bridge-piece 20 into said primary contact-screw 18, and thence through said terminal brush 32 or through the wire-conductor 34, thereby closing the electric alarm circuit and ringing the alarm, or operating any other annunciator device connected in said electric circuit.

It will be readily understood from the above description, that the fire-detector device may be readily and quickly removed from the socket-body without disturbing any circuit wires or contact elements, and the same may be replaced as easily and quickly into its operative connection with the electric alarm-circuit.

Having thus described the present invention, we claim:—

In a device of the kind described, a metallic hollow body providing an air-chamber, the upper portion of which is formed to provide screw-threads, the outer surface of said threads providing a male screw-thread and the inner surface thereof providing a female screw-thread, a supporting block of insulating material provided with a centrally disposed opening communicating with said air-chamber, the said supporting block having male threads engaging the female threads of said hollow body; a diaphragm extending across said supporting block and its opening, a movable contact-device extending across the upper surface of said diaphragm, said movable contact-device making electrical contact with the wall of said hollow body, a second supporting block also of insulating material provided upon in its under side with a recess, said second supporting block registering above said first-mentioned supporting block, having male threads engaging the female threads of the said hollow body, so as to clamp said diaphragm and said movable contact-device in position, an adjustable contact-screw centrally disposed through said second supporting block, the head of the same being exposed above said supporting block and its lower end being arranged within said recess, so as to register above and be normally separated from said movable contact device, a socket-body providing a receiving socket, a metallic shell secured within said receiving socket, having female threads adapted to be engaged by the male thread of said hollow body, means connected with said metallic shell and said hollow-body for mechanically and electrically connecting the latter with the former, a terminal brush connected with said socket-body and insulated from said metallic shell, said terminal brush being adapted to make a normal electrical contact with said contact-screw, and means for connecting said metallic shell and said terminal brush in an electric alarm-circuit.

In testimony, that we claim the invention set forth above we have hereunto set our hands this 23rd day of September, 1912.

CHARLES H. KAYSER.
WILLIAM H. HAMPTON.

Witnesses:
GEORGE D. RICHARDS,
ADOLPH HANSEN.

Copies of this patent may be obtained for five cents each, by addressing the "Commissioner of Patents, Washington, D. C."